United States Patent [19]

Ritschel et al.

[11] Patent Number: 4,549,915
[45] Date of Patent: Oct. 29, 1985

[54] METHOD AND APPARATUS FOR PROVIDING FOAMING THERMOPLASTIC COMPOSITIONS

[75] Inventors: Peter Ritschel, Steinbach; Herbert Freudenreich, Sulbach; Waldemar Hartmann, Rodheim, all of Fed. Rep. of Germany

[73] Assignee: USM Corporation, Farmington, Conn.

[21] Appl. No.: 579,892

[22] PCT Filed: May 16, 1983

[86] PCT No.: PCT/GB83/00138

§ 371 Date: Jan. 11, 1984

§ 102(e) Date: Jan. 11, 1984

[87] PCT Pub. No.: WO83/04040

PCT Pub. Date: Nov. 24, 1983

[30] Foreign Application Priority Data

May 14, 1982 [GB] United Kingdom ............... 8214175

[51] Int. Cl.[4] ........................................... B32B 31/30
[52] U.S. Cl. ...................................... 156/78; 156/291; 264/51; 425/376 R; 428/317.5
[58] Field of Search ............. 156/78, 291; 425/376 R, 425/377, 378 R; 428/317.5; 261/DIG. 26; 264/57; 427/207.1, 208.2, 244

[56] References Cited

U.S. PATENT DOCUMENTS

| | | | |
|---|---|---|---|
| 3,174,689 | 3/1965 | McIntyre | 239/70 |
| 3,362,036 | 1/1968 | Swan et al. | 156/78 X |
| 3,407,151 | 10/1968 | Overcashier et al. | |
| 4,066,188 | 1/1978 | Scholl et al. | 222/146 HE |
| 4,259,402 | 3/1981 | Cobbs et al. | 156/78 X |

FOREIGN PATENT DOCUMENTS

| | | |
|---|---|---|
| 2946916 | 6/1981 | Fed. Rep. of Germany. |
| 1325916 | 8/1973 | United Kingdom. |
| 1562562 | 3/1980 | United Kingdom. |

Primary Examiner—Robert A. Dawson
Attorney, Agent, or Firm—Aubrey C. Brine

[57] ABSTRACT

Method and apparatus for providing a foamed mass of thermoplastic, e.g., a hot melt adhesive on a substrate by introducing a foaming agent to the composition which has been melted by heating in excess of 100° C. The foaming agent is provided by water entrained in a carrier gas and is preferably introduced to the thermoplastic as it is dispensed from an applicator. The invention permits foaming of adhesives using readily available raw materials and simple equipment readily derivable from existing hot melt adhesive applicators.

11 Claims, 2 Drawing Figures

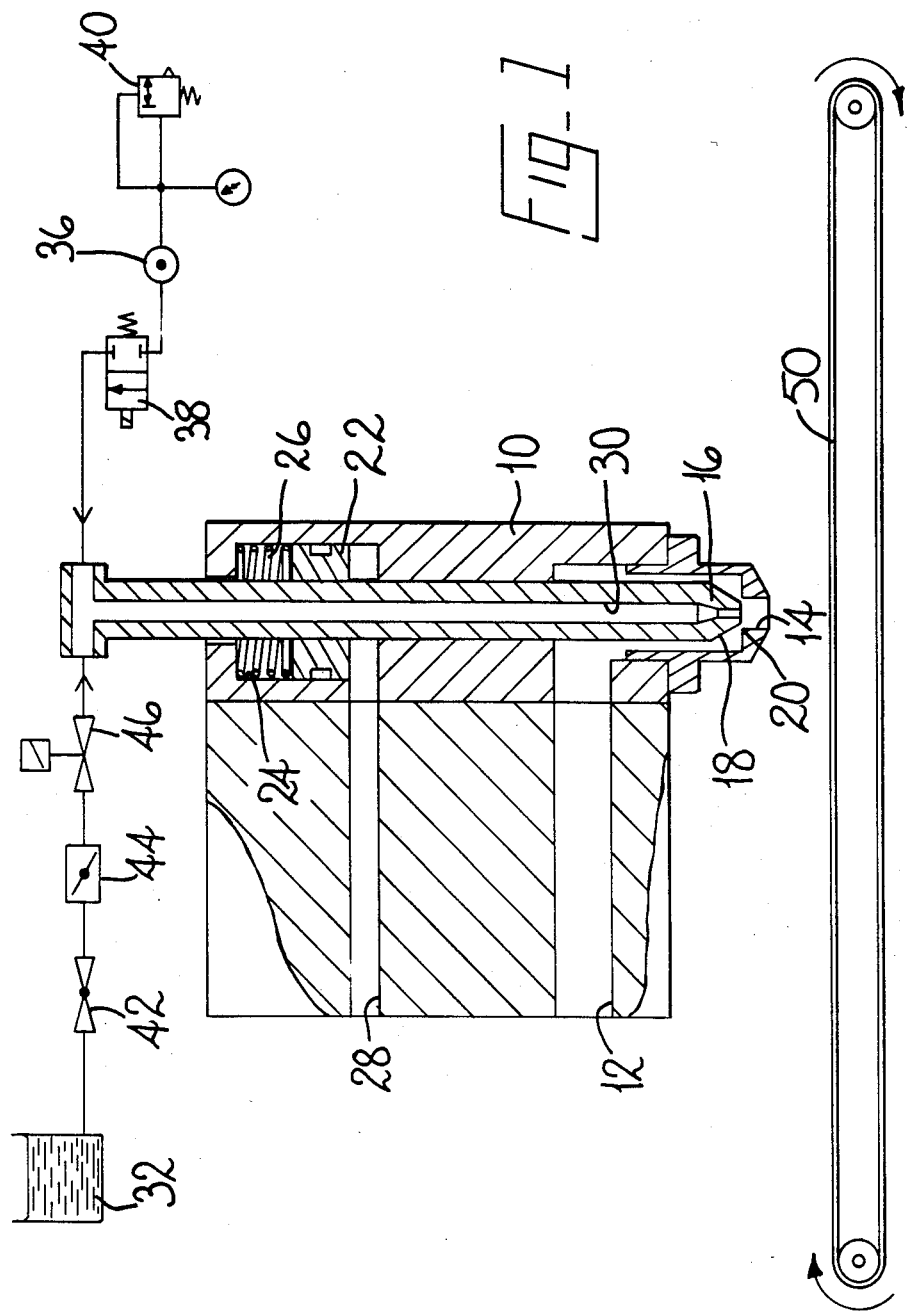
Fig_1

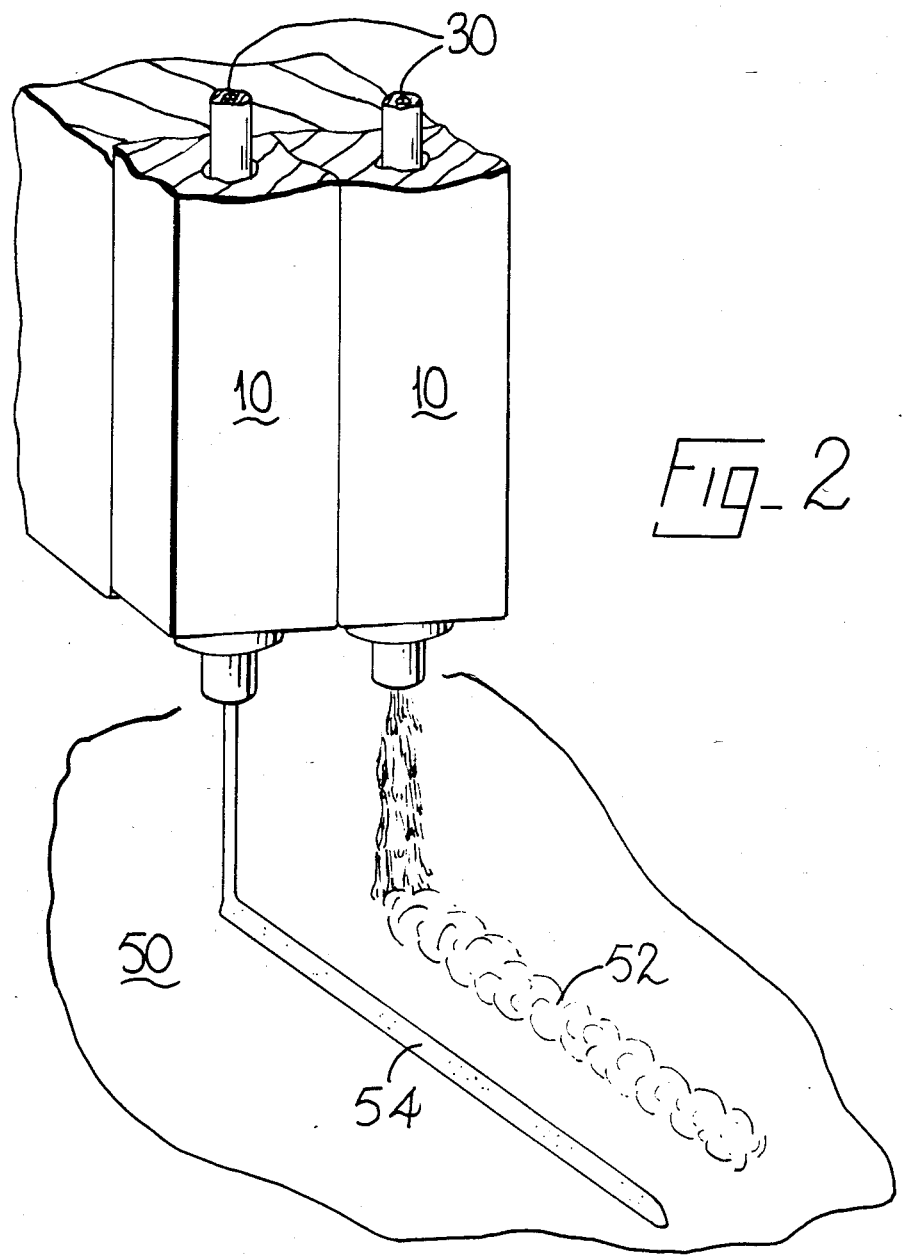
Fig_2

METHOD AND APPARATUS FOR PROVIDING FOAMING THERMOPLASTIC COMPOSITIONS

This invention is concerned with foaming thermoplastic compositions e.g. hot melt adhesives.

TECHNICAL FIELD

Hot melt adhesives are known and used in a variety of industries. They find use particularly in repetitive production line operations where their capability for rapid application and fast set up are advantageous.

BACKGROUND ART

It is known that the ability of hot melt adhesives to be spread in their molten form is encumbered by rapid set up of the adhesive in the bond. It has been proposed to improve the spreading ability of a hot melt adhesive by forming a foam of the hot melt adhesive, applying it between substrates and pressing them together whilst the foam is still hot. U.S. Pat. No. 3,362,036 discloses extrusion of a mixture of hot melt adhesive and air or other inert gas by means of an extruder in which the adhesive is melted. UK Patent Specification No. 1562562 discloses forming a foam of hot melt adhesive and gas, pressurising the foam to force the gas into solution and then dispensing the adhesive solution. German Offenlegungsschrift No. 2935580 discloses the use of a blowing agent decomposable by heat to bring about foaming of a hot melt adhesive.

Proposals for providing hot melt adhesives in foam form have generally required use of equipment significantly different from that normally used for application of hot melt adhesives, or the formulation of adhesives with selected blowing agents.

Among objects of the present invention are to provide a method and means for providing a foamed mass of thermoplastic composition on a substrate using available compositions, especially hot melt adhesives, in conjunction with commercially available applying equipment appropriately modified by comparatively simple changes.

DISCLOSURE OF THE INVENTION

We have now found that hot melt adhesives and sealants can be foamed by use of moisture to provide compositions of good spreadability, and setting speed. We have also found that a commercial applicator may be used in this process which is provided with an applicator nozzle and which is modified by addition of means for supplying water entrained in a stream of carrier gas to the location at which the hot melt is dispensed from the nozzle.

The invention provides in one of its aspects a method of providing a foamed mass for use in an adhesive bonding or sealing process in which a thermoplastic composition is melted by heating to a temperature in excess of 100° C. and expelled from an applicator in admixture with a foaming agent characterised in that the foaming agent is provided by feeding water to the melted composition entrained in a stream of carrier gas as the thermoplastic composition is expelled from the applicator.

In a method according to the invention, the use of water as foaming agent leads to a number of advantages. It is a readily available non-toxic raw material which can be handled with ease using well known techniques and is substantially inert to commonly employed hot melts. It vaporises at a temperature compatible with temperatures commonly employed for application of hot melt adhesives and sealants and therefore does not impose severe requirements for heating as may occur, for example in the case of heat decomposable blowing agents. Also, by use of a method according to the invention, it is not necessary to mix a foaming agent with the composition prior to its supply and consequently one does not need to take steps to control or compensate for loss of foaming agent which may occur for example during manufacturing operations where heat is present or generated.

Thermoplastic compositions for use in a method according to the invention include those commonly used as hot melt adhesives and sealants especially those based on ethylene vinyl acetate copolymer or polyamides.

In one method according to the invention using an illustrative device hereinafter described, and using tap water at room temperature of about 20° C.±2° C., we have observed that, irrespective of the temperature to which the thermoplastic composition is heated prior to introduction of foaming agent thereto, the temperature of the expelled mass of foaming material is normally between 110° C. and 120° C. Even if the thermoplastic composition is heated deliberately far above its normal advantageous application temperature, the foaming mass always has a temperature not higher than 120° C. after the water is added. However, the foam structure tends to be more coarsely porous and less stable when the melt temperature is very high, e.g. greater than about 260° C. Thus, melt adhesives with very high melting points foam unsatisfactorily because the foam temperature of 120° C. which automatically results from the addition of cold water lies far beneath the normal application temperatures of these adhesives.

For many bonding and sealing applications one desires a foam layer having a substantially regular outer surface and a substantially uniform cross sectional shape and size made up of a matrix of the composition and trapped bubbles of substantially uniform shape and size. With regard to adhesives and sealants, the uniform section and content of a laid down stripe of the foam is of significance in predicting the amount of foam required in a bond or joint and of controlling squabbing of excess composition from the bond or joint. Accordingly, when using tap water at room temperature to provide the foaming agent best results appear to flow from use of thermoplastic compositions having melting points such that application temperatures of the order of about 170° C. may be used, so that the risk of producing an unsatisfactory foam structure by reason of excessive heating is minimised. However, satisfactory results may be achieved using application temperatures as high as about 260° C.

The relationship between viscosity of the composition at its application temperature and the pressure at which the carrier gas is introduced appears to be important, and with simple equipment using a normal factory air line to supply the carrier gas and simple water feed arrangement we prefer to ensure that the thermoplastic composition is brought to a viscosity no greater than about 1,000 to 1,500 mPas at the temperature of application, whilst ensuring the temperature of application is not higher than about 260° C. It is usual to apply hot melt adhesives at temperatures in excess of 100° C. and of the order of 40° C. or more above the melting point of the composition. However, care must be taken to ensure that at application temperatures the composition is not caused to degrade. Thus, thermoplastic materials which have viscosities or melting points which are too high at convenient application temperatures e.g. certain polyester based hot melt adhesives are not preferred.

The ratio of thermoplastic composition to water employed in a method according to the invention does not appear to have a major influence on the fineness of the structure of the foam. In general, however, smaller amounts of water lead to smaller amounts of foaming whereas larger amounts of water lead to larger degrees of foaming. We prefer to ensure the ratio by weight of thermoplastic composition to water lies in the range 1:1 to 20:1, more preferably in the range 3.3:1 to 10:1.

In a method according to the invention the carrier gas may be any gas which can be conveyed under pressure, and which is inert to the composition used. We prefer to use dry air which is conveniently supplied from a conventional factory air line normally operating at pressures of about 6 bar to 8 bar. Air pressures of between about 0.2 bar and about 5.0 bar may be used, and we prefer to employ air at pressures of between 0.6 bar and about 3.0 bar as the carrier gas.

Using an illustrative device hereinafter described and tap water at room temperature, we have found it possible to foam selected hot melt adhesives by a method according to the invention within the following limits:

| from | 1 part hot melt adhesive<br>1 part water<br>15 liters of air<br>(=0,2 bar) | up to | 1 part hot melt adhesive<br>1 part water<br>400 liters of air<br>(=5,0 bar) |
|---|---|---|---|
| and from | 20 parts hot melt adhesive<br>1 part water<br>15 liters of air<br>(=0,2 bar) | up to | 20 parts hot melt adhesive<br>1 part water<br>400 liters of air<br>(=5,0 bar) |

In general, the larger quantities of air are required with the higher melting point, higher viscosity materials to produce desired foam structures. Quantities of air in excess of 400 liters (5 bar) tend to produce a spray rather than the desired foam structure.

Whilst not wishing to be bound by any particular theory, and whilst the mechanism is not fully known or understood, the following is offered as a possible explanation of this phenomenon. Water introduced to the hot mass boils as a result of the effect of heat drawn from the applicator head and, in the foaming mass, drawn from the hot composition. Formation of steam is accompanied by a drop in temperature of the composition and a 'setting' of its structure to trap the steam as bubbles in a matrix of the set composition. In those cases where there is a substantial temperature drop involved, the size of at least some bubbles formed prior to setting of the composition may be large, leading to a coarser foam structure. Distribution of the bubbles within the foamed composition is presumably dependant upon distribution of the water in the molten composition and accordingly one may consider it dependant on viscosity of the molten composition and its ability to accept introduction of the carrier gas and water under more or less pressure. After initial abrupt cooling of the foamed mass one may envisage that condensing or escape of the water vapour is inhibited by the hot structure of the matrix, and that cooling and hardening of the whole foamed mass is retarded as a result of an insulating effect of the foam. When thoroughly collapsed as by pressure between cool adherends juxtaposed with the foamed mass between them the collapsed matrix hardens rapidly to yield a beneficially thin layer of the thermoplastic composition.

A method according to the invention is preferably employed in the production of adhesively bonded assemblies by dispensing the foam onto a first substrate and pressing a second substrate onto the hot foam to form an adhesive bond and is preferably employed in the production of laminar bondings using small quantities of adhesive, but is also useful in the bonding of foamed thermoplastics, in the bonding of mitre joints or corner areas, and in the sealing of joints between various materials.

It is noteworthy that by use of a method according to the invention, the time period during which the composition remains capable of forming an adhesive bond (the open time) is reduced as compared with the open time of unfoamed hot melt adhesives which we believe is due to reduction in the temperature of the composition as it is expelled from the applicator device in admixture with the foaming agent. The time period required for the composition to set when an adhesive bond is formed (the setting time) is also reduced as compared with the setting time of unfoamed hot melt adhesives. These and other properties for example improved wetting and agressive tackiness of the foam can be employed with advantage in many bonding and sealing tasks of which the following are examples.

Cardboard articles with surfaces which are difficult to wet with or are sensitive to normal hot melt adhesives, for example coated but unlacquered papers and roughened materials like upper leather, when bonded with unfoamed hot melt adhesives can be easily separated. In contrast, when bonded by use of a method according to the invention a full bonding of the complete surface occurs with break of the substrate and a shorter setting time. The bonding of foamed polystyrene normally requires the use of adhesives which can be applied at temperatures below 120° C. because otherwise the polystyrene foam would melt and the adhesive soak into the material. This makes the use of normal hot melt adhesives impossible. In contrast, use of a method according to the invention allows application of a hot melt adhesive heated to 180° C. and applied as a foam without destroying the surface of the polystyrene foam material, and results in optimum bondings. When forming a joint between mitred corner pieces using a normal hot melt adhesive, the parts can only be bonded over a limited area because otherwise too much adhesive would be applied and the mitre would not show an angle of exactly 90°. In contrast, use of a method according to the invention permits bonding of the entire surface with a small amount of adhesive, because the foam can be spread and compressed to nearly nothing, thus permitting a thin bonding layer of uniform thickness in the joint. The setting time is noticeably shorter than with normal adhesives. Bonding and filling of corner areas is conventionally only possible under very laborious conditions. In contrast by use of a method according to the invention a hot melt foam can be applied to fill out the entire corner and to wet with hot melt adhesive all those surfaces which require bonding. Bonding of large surfaces over their whole surface area can be carried out by a method according to the invention by employing several applicator nozzles appropriately disposed to lay down parallel bands of foaming adhesive of any width using small amounts of adhesive composition. When a second surface is pressed onto these bands, the foam becomes compressed into a thin uniform layer of adhesive which sets quickly to form an adhesive bond.

A device for use in carrying out a method according to the invention may be provided by coupling means for supply of water and carrier gas to an applicator for melted thermoplastic which is provided with a suitable nozzle orifice. A suitable device is hereinafter described which is illustrative of apparatus aspects of the invention. The illustrative device is suitable for use in a method according to the invention and comprises a heat conductive body portion having a melt supply passageway to provide communication between a source of melted thermoplastic composition and a nozzle orifice from which the composition is to be expelled, a valve element arranged for closing the nozzle orifice to control outflow of adhesive therefrom, and a gas supply passageway located within the valve element to provide communication between sources of water and carrier gas and the nozzle orifice, the construction and arrangement being such that upon relative movement between the valve element and nozzle orifice to permit outflow of thermoplastic composition from the orifice, water and carrier gas may be introduced under pressure to the outflowing composition.

In the illustrative device, the valve element is mounted for reciprocation in the body portion and pneumatic means is provided for controlling its movement to regulate supply of melted thermoplastic composition from the nozzle orifice. Means is provided for controlling the quantity of water supplied to the gas supply passageway and for controlling the pressure of the carrier gas supply.

In the illustrative device the valve element is tubular, its bore providing the gas supply passageway and being arranged to vent directly through the nozzle orifice. Thus, the water and carrier gas are introduced to the outflowing composition as it emerges from the nozzle orifice.

The invention provides in another of its aspects an applicator device suitable for use in a method according to the invention, comprising a heat conductive body portion having a melt supply passageway to provide communication between a source of melted thermoplastic composition and a nozzle orifice from which the composition is to be expelled, a valve element arranged for closing the nozzle orifice to control outflow of adhesive therefrom, characterised in that a gas supply passageway is located within the valve element to provide communication between sources of water and carrier gas and the nozzle orifice, and in having means for controlling the quantity of water supplied to the carrier gas and means for controlling the pressure of the carrier gas supply, the construction and arrangement being such that upon relative movement between the valve element and the nozzle orifice to permit outflow of thermoplastic composition from the orifice, water and carrier gas may be fed under pressure to the outflowing composition to provide a foamed mass.

In order that the invention may be more clearly understood, there now follows a description of the illustrative device and examples of its use in dispensing a mass of foamed thermoplastic adhesion composition on a substrate. It is to be clearly understood that the illustrative device and examples have been selected for description to illustrate the invention by way of example only and not by way of limitation thereof.

BRIEF DESCRIPTION OF THE DRAWINGS

In the drawings:

FIG. 1 is a schematic diagram of the illustrative device, and

FIG. 2 is a perspective view showing stripes of the same amount by weight of thermoplastic adhesive composition in unfoamed and foamed condition, the foamed material having been provided by a method according to the invention.

MODES FOR CARRYING OUT THE INVENTION

The illustrative device is an applicator device intended for application of hot melt adhesive. The device comprises a heat conductive body portion 10 having a melt supply passageway 12 which communicates with a source of hot melt adhesive via a heated hose 13 (not shown) and a nozzle orifice 14 formed in a nozzle screwed into the body portion 10. A valve element provided by a jet needle valve 16 is mounted for reciprocation in the body portion and is formed with a conical surface 18 adapted to engage a valve seat surface 20 of the nozzle at the orifice 14. A piston 22 secured to the needle valve 16 is arranged for movement in a cylindrical opening 24 of the body portion and is urged downwardly by a spring 26 to an extent sufficient to cause the surface 18 of the needle valve 16 to engage the valve seat surface 20. The needle valve may be raised in the body portion by admission of air under pressure via a passageway 28 to the underside of the piston 22.

A bore 30 extending axially of the needle valve provides a gas supply passageway to provide communication between sources of water 32 and carrier gas and the nozzle orifice 14. The carrier gas employed is conveniently air from a factory air line operating at 6 bar which is conducted through a main pressure inlet 36 set at a required pressure, and a magnetic valve 38 arranged to open and close the supply line. A pressure relief valve 10 is also provided. Water is arranged to be supplied under pressure from the source 32 via a pressure relief valve 42, a throttle 44 for controlling the amount of water supplied, and a magnetic valve 46 arranged to open and close the supply line.

When using the illustrative device with the example compositions, air and water are fed at required rates simultaneously to the bore 30 of the needle valve 16. The water thereby becomes entrained as droplets in a stream of air as carrier gas. The body portion and hose are heated to appropriate temperatures, and hot melt adhesive is pumped to the passageway 12 under pressure. The piston 22 is actuated to raise the needle valve 16 in the body portion in order to permit outflow of hot melt adhesive from the nozzle orifice. By virtue of the construction and arrangement of parts, water and carrier gas thus are introduced to the outflowing hot melt at the orifice 14 without requirement for a special mixing container or a chamber in which a mixture of hot melt and gas are maintained under pressure.

Material issuing from the nozzle orifice (14) is directed as a spray-like mixture onto a substrate supported on a moving conveyor belt (50). A frothy foam consisting of up to about 50% solids builds up on the workpiece which may collapse to some extent after a few seconds but nevertheless retains some foam structure and retains its ability to form a bond for many seconds.

The illustrative apparatus was used to provide a foamed mass of adhesive on paper transported on the belt (50), using various example hot melt adhesive compositions of the following formulae.

| Material | Parts by weight |
| --- | --- |
| Example Composition 1 | |
| Hydrocarbon Resin (melting point 110° C.) | 50 |
| Paraffin Wax (melting point 64° C.) | 25 |
| Ethylene Vinyl Acetate Copolymer 1 | 25 |
| Example Composition 2 | |
| Hydrocarbon Resin (melting point 110° C.) | 44 |
| Polyethylene | 12 |
| Ethylene Vinyl Acetate Copolymer 2 | 27 |
| Ethylene Ethyl Acrylate Copolymer | 5 |
| Paraffin Wax (melting point 64° C.) | 12 |
| Example Composition 3 | |
| A copolyamide reaction product of: | |
| Dimerised Fatty Acid | 87 |
| Adipic Acid | 2 |
| Ethylene Diamine | 11 |
| Example Composition 4 | |
| A copolyamide reaction product of: | |
| Dimerised Fatty Acid | 75 |
| Adipic Acid | 7 |
| Fumaric Acid | 1 |
| Ethylene Diamine | 17 |

In these example compositions, the materials used were as follows:

Hydrocarbon resin; Escorez resin 5310 from Esso Chemic (melting point 110° C.).

Paraffin wax; Arcowax 4213G, Arco Raffinerie Hamburg.

Ethylene vinyl acetate copolymer 1; Elvax 250, Dupont.

Ethylene vinyl acetate copolymer 2; Elvax 210, Dupont.

Ethylene ethyl acrylate copolymer; Copolymer DPD 9169, Union Carbide.

Polyethylene; Alkathene 15023, ICI.

Dimerised fatty acid; Empol 1018, Unilever.

Softening points, melting points and viscosities of these compositions are given in the following table:

| Example Composition | | 1 | 2 | 3 | 4 |
| --- | --- | --- | --- | --- | --- |
| Softening point (Kofler) | °C. | 62 | 73 | 150 | 158 |
| Melting point (Kofler) | °C. | 68 | 95 | 153 | 165 |
| Melt viscosity (Haake Rotovisko) (MPas) | | | | | |
| PK I 54 rpm @ | 100° C. | 4700 | | | |
| | 140° C. | 1400 | | | |
| | 160° C. | 750 | | | |
| PK II 54 rpm @ | 180° C. | | 3700 | 4900 | |
| | 200° C. | | 2300 | | 1200 |
| | 220° C. | | 1600 | | |

EXAMPLE 1

A series of tests was conducted, using the illustrative device and example composition 1 to determine the amount of tap water at room temperature (20° C.±2° C.) to be used with a constant carrier gas pressure to achieve a useful foamed adhesive mass on the paper. In this series, the temperature of adhesive in the source reservoir was maintained at 150° C., the hose (13) was maintained at 160° C. and the body portion (10) at 180° C.

During application of the adhesive the temperature of the body portion fell to 160° C., and the temperature of the foaming mass was found to be 115° C. The pressure of the air supplied to the bore (30) was maintained at 0.8 bar. (Operating air pressure nozzle: 4.0 bar.) It was found that the water quantity to be added can be varied between 10 and 30% of the required adhesive quantity. i.e. the ratio by weight of thermoplastic composition to water used may be in the range 3.3:1 to 10:1. The foam stays stable for about 5 seconds and collapses after that time, it covers twice to four times the surface of the substrate compared with a non-foamed coat at the same discharge rate.

By way of comparison a stripe (52) of foaming hot melt of example composition 1 was laid down as above described (using 30% tap water at room temperature) alongside a bead (54) of the same composition extruded under the same conditions with the exception that no water and no air were introduced to the emerging melt. The comparative bead and stripe were laid down at the rate of 10 g example composition per meter. The resulting bead and stripe are shown in FIG. 2. The thickness and width of the adhesive bead and stripe measured before and after cooling were:

| | Unfoamed bead (54) | Foamed stripe (52) |
| --- | --- | --- |
| thickness of the hot adhesive layer | 3,5 mm | 10,0 mm |
| width of the hot adhesive layer | 8,0 mm | 20,0 mm |
| thickness of the cooled-down adhesive layer | 3,5 mm | 1,7 mm |
| width of the cooled-down adhesive layer | 8,0 mm | 20,0 mm |

As can be seen the bead (54) is of substantially constant dimensions after extrusion whereas the stripe (52) is larger. Immediately after extrusion it foams and the foaming mass continues to expand for a short period and then begins to collapse as it cools. The stripe (52) nevertheless maintains a substantially uniform size and regular surface characteristics for several seconds.

EXAMPLE 2

A series of tests was conducted, using the illustrative device and example composition 1 to determine the air pressure required to achieve the most favourable foaming conditions at constant ratios of adhesive and tap water at room temperature. It has found that an optimum result was obtained with conditions as follows:

Nozzle temperature: 180° C. (160° C.)
Starting air pressure: 0.8 bar
Discharge: 120 g/min
Water: approx 30% by weight based on the hot melt
Belt speed: 16 m/min Air pressures in excess of 0.8 bar do not appear necessary and indeed an air pressure of more than 3.0 bar causes the thermoplastic material to atomize with consequent formation of webs rather than a foam, which is undesirable in many applications. In each case the temperature of the foaming mass was about 110° C. to 115° C.

EXAMPLE 3

Example compositions 2, 3 and 4 were subjected to a series of tests to determine optimum foam-extrusion conditions for these thermoplastic materials. None of these compositions could be foamed satisfactorily under the conditions specified in Example 2. It was found that using the illustrative device as described above optimum conditions for dispensing a desirable foamed adhesive mass were as follows:

| Example Composition 2 | | |
|---|---|---|
| Required conditions: | Temperatures: | Reservoir 180° C.<br>Hose 200° C.<br>Nozzle 240° C.<br>(falling to approx 220° C.) |
| | Starting air pressure: | 1,5–2,0 bar |
| | Discharge: | at least 150–200 g/min |
| | Water: | 20–30% |
| Example Composition 3 | | |
| Required conditions: | Temperatures: | Resevoir 200° C.<br>Hose 220° C.<br>Nozzle 240–260° C.<br>(falling to approx 220–240° C.) |
| | Starting air pressure: | at least 1,5 bar |
| | Discharge: | 100 g/min |
| | Water | 20–30% |
| Example Composition 4 | | |
| Required conditions: | Temperatures: | Reservoir 180° C.<br>Hose 220° C.<br>Nozzle 260° C.<br>(falls to approx 240° C.) |
| | Starting air pressure: | 1,5–3,0 bar |
| | Discharge: | 150 g/min |
| | Water: | 10–30% |

It is noted that the application temperature for each composition reflects the melting point of the composition, and to some extent at least the viscosity of the melted composition. It was observed that the temperature of the foaming mass applied was in the range of about 110° C. to about 120° C. for these compositions under optimum conditions of application.

These results show that optimum conditions for a composition depend upon melting point of the composition and also on viscosity characteristics of the composition.

The size of the bubbles produced with each of these compositions by the method described depends on the quantity of water injected. The most advantageous size of the bubbles appears to be not less than 0.1 mm and not greater than 0.6 mm and preferably about 0.2 to 0.3 mm diameter when at their maximum after foaming of the mass and before collapse of the foam.

EXAMPLE 4

The open time of the foamed hot melt materials was found to be shorter than that of non-foamed hot melt adhesives.

| Example Composition 1 | not foamed | approx 60 seconds |
|---|---|---|
| | foamed | approx 40 seconds |
| Example Composition 2 | not foamed | approx 50 seconds |
| | foamed | approx 30 seconds |
| Example Composition 3 | not foamed | approx 80 seconds |
| | foamed | approx 40 seconds |
| Example Composition 4 | not foamed | approx 50 seconds |
| | foamed | approx 30 seconds |

The setting times decrease accordingly.

The following examples 5 and 6 also illustrate industrial applicability of the invention.

EXAMPLE 5

Bonding of foamed polystyrene (A) Using example composition 1, unfoamed in a quantity of 10 g/linear meter of substrate, a 10 mm wide and 3.5 mm thick adhesive bead was formed on a foamed polystyrene substrate. The hot adhesive ate itself into the foamed polystyrene to a depth of about 4 mm, forming a groove. This left no possibility to bond any other substrate with the already applied hot melt adhesive.

(B) Using example composition 1, foamed under optimum conditions as described in Example 2 in a quantity of 10 g/linear meter of substrate, a stripe of foamed adhesive approximately 20 mm wide and 10 mm thick was formed on the polystyrene substrate. The hot adhesive did not eat itself into the foamed polystyrene, so that all of the applied adhesive quantity was available to make an adhesive bond to another surface pressed against the hot foam.

EXAMPLE 6

Mitre bonding (chipboard to chipboard 20 mm thick)

(A) Using example composition 1, unfoamed in a quantity of 10 g/linear meter of substrate, a 10 mm wide and 3.5 mm thick adhesive bead was formed on a 20 mm thick chipboard mitre surface. This means that only 50% of the disposable adhesion surface was covered. A second 20 mm thick mitred chipboard substrate was pressed onto the adhesive layer. The adhesive joint was thick, irregular and easy to destroy.

(B) Using example composition 1, formed under optimum conditions as described in Example 2 in a quantity of 10 g/linear meter of substrate, a stripe of foamed adhesive 20 mm wide and 10 mm thick was formed on a 20 mm thick chipboard mitre surface so that the entire surface (20 mm) was covered by adhesive. This means, 100% of the disposable adhesion surface was covered. A corresponding mitre surface of a second 20 mm thick chipboard substrate was pressed onto the hot adhesive layer, compressing the foam. The adhesive joint was smooth, very thin, and the bond could be destroyed only by material break.

We claim:

1. A method of providing a foamed mass for use in an adhesive bonding or sealing process in which a thermoplastic composition is melted by heating to a temperature in excess of 100° C. and expelled through a nozzle from an applicator in admixture with a foaming agent characterized in that the foaming agent is water which is entrained in a stream of carrier gas and injected into the thermoplastic composition as it passes through the nozzle and is thereby distributed throughout the melted composition as it is expelled from the applicator.

2. A method according to claim 1 further characterised in that the expelled composition is deposited on a substrate and is allowed to foam freely under atmospheric pressure.

3. A method according to claim 1 or claim 2 further characterized in that the thermoplastic composition is brought to a viscosity no greater than about 1,500 mPas for introduction of the foaming agent.

4. A method according to claim 1 or claim 2 further characterized in that the thermoplastic composition and water are employed in a ratio by weight in the range 3.3:1 to 10:1 and the carrier gas is air under pressure.

5. A method according to claim 1 or claim 2 wherein the thermoplastic material is dispensed at a rate of between about 100 g/min and about 200 g/min.

6. A method according to claim 1 or claim 2 further characterized in that the thermoplastic composition is an adhesive or sealant composition of melting point about 68° C. and comprising ethylene vinyl acetate copolymer, and the carrier gas is air at a pressure of 0.8 to 3.0 bar.

7. A method according to claim 1 or claim 2 further characterized in that the thermoplastic composition is an adhesive or sealant composition of melting point in the range of about 95° C. to about 165° C. comprising ethylene vinyl acetate copolymer, or a copolyamide and the carrier gas is air at a pressure of 1.5 to 3.0 bar.

8. A method of claim 1 or claim 2 further including the step of pressing a second substrate against the foamed mass to form an adhesive bond.

9. A method according to claim 8 wherein at least one of the substrates comprises foamed polystyrene, or chipboard.

10. An applicator device suitable for providing and applying a foamed adhesive mass comprising a heat conductive body portion having a melt supply passageway to provide communication between a source of melted thermoplastic composition and a nozzle orifice from which the composition is to be expelled, a valve element arranged for closing the nozzle orifice to control outflow of adhesive therefrom, characterized in that a gas supply passageway is located within the valve element to provide communication between sources of water and carrier gas and the nozzle orifice, and in having means for controlling the quantity of water supplied to the carrier gas and means for controlling the pressure of the carrier gas supply, the construction and arrangement being such that upon relative movement between the valve element and nozzle orifice to permit outflow of thermoplastic composition from the orifice, water and carrier gas may be fed under pressure to the composition flowing out through the nozzle and is distributed throughout the melted composition to provide a foamed mass upon expulsion from the applicator.

11. A device according to claim 10 further characterised in that pneumatic means is provided for controlling relative movement between the valve element and nozzle orifice.

* * * * *